(12) United States Patent
Richman et al.

(10) Patent No.: US 10,613,428 B2
(45) Date of Patent: Apr. 7, 2020

(54) WALLPAPER-BASED LENTICULAR PROJECTION SCREEN

(71) Applicant: Sony Corporation, Tokyo (JP)

(72) Inventors: Steven Richman, San Diego, CA (US); Thomas Dawson, Escondido, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/608,667

(22) Filed: May 30, 2017

(65) Prior Publication Data

US 2018/0348623 A1    Dec. 6, 2018

(51) Int. Cl.
*G03B 21/602* (2014.01)
*B44C 7/00* (2006.01)
*E04F 13/18* (2006.01)
*G03B 21/58* (2014.01)
*E04F 13/08* (2006.01)

(52) U.S. Cl.
CPC .............. *G03B 21/602* (2013.01); *B44C 7/00* (2013.01); *E04F 13/0885* (2013.01); *E04F 13/18* (2013.01); *G03B 21/58* (2013.01)

(58) Field of Classification Search
CPC .............................. G03B 21/602; G03B 21/58
USPC .................................................. 359/443, 455
See application file for complete search history.

(56) References Cited

U.S. PATENT DOCUMENTS

| | | | |
|---|---|---|---|
| 2,281,101 A | 4/1942 | Land | |
| 2,740,954 A * | 4/1956 | Kleefeld | H01J 29/89 313/478 |
| 3,510,197 A * | 5/1970 | Fukke | G03B 21/602 359/455 |
| 3,961,839 A | 6/1976 | Brobst | |
| 5,111,337 A | 5/1992 | Martinez | |
| 5,218,472 A | 6/1993 | Jozefowicz et al. | |
| 5,361,164 A | 11/1994 | Steliga | |
| 5,530,571 A | 6/1996 | Chen | |
| 5,625,489 A | 4/1997 | Glenn | |
| 5,764,248 A | 6/1998 | Scarpetti | |

(Continued)

FOREIGN PATENT DOCUMENTS

| | | | |
|---|---|---|---|
| EP | 0421809 A2 | 4/1991 | |
| GB | 624772 A * | 6/1949 | ........... G03B 21/602 |

(Continued)

OTHER PUBLICATIONS

Displays2Go website 20 Pocket Business Card Holder https://web.archive.org/web/20150822152559/http://www.displays2go.com/P-14613/Business-Card-Dispenser-Can-Make-You-Money?st=Category&sid=4514 Aug. 2015.*

(Continued)

*Primary Examiner* — Christopher E Mahoney
(74) *Attorney, Agent, or Firm* — John L. Rogitz (57) ABSTRACT

A customer can install a lenticular projection screen without the need to hire a professional installer. A section of a home wall is smoothed flat and lenticular wallpaper is applied to it with adhesive. Once the adhesive has dried, a short throw projector can perform an automatic alignment to gain the best possible picture from the lenticular screen. The installation material may be provided as a kit that a consumer can use to install the lenticular projection screen. Instead of on a wall, the wallpaper may be placed on a stiff flat surface hung from an overhead bracket or attached to a backside wall mount.

8 Claims, 7 Drawing Sheets

(56) References Cited

U.S. PATENT DOCUMENTS

| | | |
|---|---|---|
| 5,777,720 A | 7/1998 | Shapiro et al. |
| 5,903,328 A | 5/1999 | Greene et al. |
| 6,013,123 A | 1/2000 | Scarpetti |
| 6,208,325 B1 | 3/2001 | Reddy et al. |
| 6,301,051 B1 | 10/2001 | Sankur |
| 6,337,769 B1* | 1/2002 | Lee .................. E06B 9/24 |
| | | 160/115 |
| 6,529,322 B1* | 3/2003 | Jones ............. G03B 21/602 |
| | | 359/443 |
| 6,530,664 B2 | 3/2003 | Vanderwerf et al. |
| 6,842,282 B2 | 1/2005 | Kuroda et al. |
| 6,892,949 B2 | 5/2005 | Mondie |
| 7,072,108 B2 | 7/2006 | Cruz-Uribe et al. |
| 7,130,118 B2 | 10/2006 | Smythe et al. |
| 7,248,406 B2 | 7/2007 | May et al. |
| 7,384,158 B2 | 6/2008 | Ramachandran et al. |
| 7,480,096 B2 | 1/2009 | May et al. |
| 7,535,636 B2 | 5/2009 | Lippey et al. |
| 7,538,942 B2 | 5/2009 | Odagiri et al. |
| 7,545,397 B2 | 6/2009 | O'Dea et al. |
| 7,614,750 B2 | 11/2009 | May et al. |
| 7,661,828 B2 | 2/2010 | Allen et al. |
| 7,733,310 B2 | 6/2010 | Hajjar et al. |
| 7,911,693 B2 | 3/2011 | Smith et al. |
| 7,936,507 B2 | 5/2011 | Sano et al. |
| 7,974,005 B2 | 7/2011 | Huibers et al. |
| 8,081,368 B2 | 12/2011 | Lippey |
| 8,218,236 B2 | 7/2012 | Shiau et al. |
| 8,284,487 B1 | 10/2012 | Liu |
| 8,411,983 B2 | 4/2013 | Wei |
| 8,469,519 B2 | 6/2013 | Marcus et al. |
| 8,649,090 B2 | 2/2014 | Hosoi |
| 8,913,000 B2 | 12/2014 | Erol et al. |
| 9,412,318 B2 | 8/2016 | Chang |
| 9,640,143 B1 | 5/2017 | Dawson et al. |
| 9,792,847 B2 | 10/2017 | Dawson et al. |
| 2001/0035927 A1 | 11/2001 | Sasagawa et al. |
| 2003/0147053 A1 | 8/2003 | Matsuda et al. |
| 2004/0257649 A1 | 12/2004 | Heikkila et al. |
| 2005/0128581 A1 | 6/2005 | Samuels et al. |
| 2006/0038962 A1 | 2/2006 | Matsumoto et al. |
| 2006/0061860 A1 | 3/2006 | Devos et al. |
| 2006/0209213 A1 | 9/2006 | Baker |
| 2006/0228523 A1 | 10/2006 | Cronin |
| 2006/0279839 A1 | 12/2006 | May et al. |
| 2007/0003272 A1* | 1/2007 | Robb .................. G03B 15/07 |
| | | 396/333 |
| 2007/0014318 A1 | 1/2007 | Hajjar et al. |
| 2007/0040989 A1 | 2/2007 | Weng et al. |
| 2007/0133088 A1 | 6/2007 | Lippey et al. |
| 2007/0177063 A1 | 8/2007 | Hiramatsu |
| 2007/0211227 A1 | 9/2007 | Era |
| 2008/0100564 A1 | 5/2008 | Vincent et al. |
| 2008/0144172 A1 | 6/2008 | Sano et al. |
| 2008/0239497 A1 | 10/2008 | Lippey |
| 2008/0304014 A1 | 12/2008 | Vaan |
| 2009/0086296 A1 | 4/2009 | Renaud-Goud |
| 2009/0091718 A1 | 4/2009 | Obi et al. |
| 2010/0097699 A1 | 4/2010 | Destain et al. |
| 2010/0207956 A1 | 8/2010 | Keh et al. |
| 2010/0245995 A1 | 9/2010 | Graetz et al. |
| 2011/0019914 A1 | 1/2011 | Bimber et al. |
| 2011/0075114 A1* | 3/2011 | Tanis-Likkel ......... G03B 21/26 |
| | | 353/97 |
| 2011/0179734 A1 | 7/2011 | Shaffer |
| 2012/0223879 A1 | 9/2012 | Winter |
| 2013/0033530 A1 | 2/2013 | Gamache et al. |
| 2014/0028594 A1 | 1/2014 | Chen et al. |
| 2014/0104297 A1 | 4/2014 | Yang |
| 2014/0168288 A1 | 6/2014 | Tusch |
| 2014/0354698 A1 | 12/2014 | Lee et al. |
| 2015/0077849 A1* | 3/2015 | Sadahiro ............ G03B 21/60 |
| | | 359/455 |
| 2015/0138627 A1 | 5/2015 | Ehrensperger et al. |
| 2015/0194067 A1* | 7/2015 | Kindschuh ............ G09B 5/02 |
| | | 434/365 |
| 2015/0309316 A1 | 10/2015 | Osterhout et al. |
| 2015/0346592 A1* | 12/2015 | Corey .................. G03B 21/10 |
| | | 353/79 |
| 2016/0088275 A1 | 3/2016 | Fuchikami |
| 2016/0243773 A1 | 8/2016 | Wang |
| 2016/0366379 A1 | 12/2016 | Hickl |
| 2017/0032728 A1 | 2/2017 | Shima et al. |
| 2017/0075207 A1* | 3/2017 | Tao .................... G02B 5/02 |
| 2017/0269360 A1 | 9/2017 | Yamaguchi et al. |
| 2019/0283673 A1 | 9/2019 | Karner et al. |
| 2019/0285878 A1 | 9/2019 | Hansen et al. |

FOREIGN PATENT DOCUMENTS

| | | | |
|---|---|---|---|
| JP | H09274159 A | | 10/1997 |
| JP | 2002-97730 | * | 4/2002 |
| JP | 2008032925 A | | 2/2008 |
| KR | 10-2016-0103460 | * | 9/2016 |

OTHER PUBLICATIONS

4OVER4 website 3d Lenticular Business Cards https://web.archive.org/web/20140729163035/http://www.4over4.com/printing/3d-lenticular-business-cards Jul. 2014.*

Thomas Dawson, Steven Richman, "Multichromic Filtering Layer to Enhance Screen Gain", related U.S. Appl. No. 15/656,691, Non-Final Office Action dated Dec. 13, 2018.

Thomas Dawson, Steven Richman, "Multichromic Filtering Layer to Enhance Screen Gain", related U.S. Appl. No. 15/656,691, Applicant's response to Non-Final Office Action filed Dec. 17, 2018.

"Team Develops new, inexpensive transparent projection screen (w/Video)", Phys.Org, Jan. 21, 2014.

Thomas Dawson, Steven Richman, "Multichromic Reflective Layer to Enhance Screen Gain", related U.S. Appl. No. 15/656,495, Examiner's Answer dated Oct. 17, 2018.

Thomas Dawson, Steven Richman, "Multichromic Reflective Layer to Enhance Screen Gain", related U.S. Appl. No. 15/656,495, Reply Brief filed Oct. 24, 2018.

Thomas Dawson, Steven Richman, "Multichromic Reflective Layer to Enhance Screen Gain", related U.S. Appl. No. 15/656,495, Applicant's response to Final Office Action filed Aug. 8, 2018.

Thomas Dawson, Steven Richman, "Multichromic Filtering Layer to Enhance Screen Gain", related U.S. Appl. No. 15/656,691, Applicant's response to Final Office Action filed Aug. 8, 2018.

Thomas Dawson, Steven Richman, "Multichromic Reflective Layer to Enhance Screen Gain", related U.S. Appl. No. 15/656,495, Final Office Action dated Jul. 24, 2018.

Thomas Dawson, Steven Richman, "Multichromic Filtering Layer to Enhance Screen Gain", related U.S. Appl. No. 15/656,691, Final Office Action dated Jul. 26, 2018.

Thomas Dawson, Steven Richman, "Microfaceted Projection Screen", related U.S. Appl. No. 15/615,523, Non-Final Office Action dated Sep. 27, 2018.

Thomas Dawson, Steven Richman, "Microfaceted Projection Screen", related U.S. Appl. No. 15/615,523, Applicant's response to Non-Final Office Action filed Oct. 1, 2018.

Thomas Dawson, Steven Richman, "Multichromic Reflective Layer to Enhance Screen Gain", related U.S. Appl. No. 15/656,495, Applicant's response to Non-Final Office Action filed May 21, 2018.

"How to Setup a Projector Screen", Ebay, Mar. 13, 2016. Retrieved from http://www.ebay.com/gds/How-to-Set-Up-a-Projector-Screen-/10000000205290613/g.html.

"Viewall® Erasable Wall Material", Visual Planning 2015 Corporation, Sep. 15, 2016. Retrieved from http://www.visualplanning.com/boardswallmaterial2.html.

Thomas Dawson, Steven Richman, "Multichromic Reflective Layer to Enhance Screen Gain", related U.S. Appl. No. 15/656,495, Non-Final Office Action dated May 15, 2018.

(56) References Cited

OTHER PUBLICATIONS

Thomas Dawson, Steven Richman, Frederick J. Zustak, "Transparent Glass of Polymer Window Pane as a Projector Screen", related U.S. Appl. No. 15/602,796, Non-Final Office Action dated Jan. 28, 2019.
Thomas Dawson, Steven Richman, Frederick J. Zustak, "Transparent Glass of Polymer Window Pane as a Projector Screen", related U.S. Appl. No. 15/602,796, Applicant's response to Non-Final Office Action filed Feb. 5, 2019.
Thomas Dawson, Steven Richman, "Microfaceted Projection Screen", related U.S. Appl. No. 15/615,523, Final Office Action dated Feb. 5, 2019.
Thomas Dawson, Steven Richman, "Microfaceted Projection Screen", related U.S. Appl. No. 15/615,523, Applicant's response to Final Office Action filed Feb. 11, 2019.
Thomas Dawson, Steven Richman, "Multichromic Filtering Layer to Enhance Screen Gain", related U.S. Appl. No. 15/656,691, Final Office Action dated Feb. 7, 2019.
Thomas Dawson, Steven Richman, "Multichromic Filtering Layer to Enhance Screen Gain", related U.S. Appl. No. 15/656,691, Non-Final Office Action dated Jun. 12, 2018.
Thomas Dawson, Steven Richman, "Multichromic Filtering Layer to Enhance Screen Gain", related U.S. Appl. No. 15/656,691, Applicant's response to Non-Final Office Action filed Jun. 14, 2018.
Steven Martin Richman, Thomas Dawson, Frederick J. Zustak, "Dual Layer EScreen to Compensate for Ambient Lighting", related U.S. Appl. No. 15/601,758, Non-Final Office Action dated Jan. 19, 2018.
Steven Martin Richman, Thomas Dawson, Frederick J. Zustak, "Dual Layer EScreen to Compensate for Ambient Lighting", related U.S. Appl. No. 15/601,758, Applicant's response to Non-Final Office Action filed Jan. 23, 2018.
Thomas Dawson, Steven Richman, "Multichromic Reflective Layer to Enhance Screen Gain", related U.S. Appl. No. 15/656,495, Final Office Action dated Jan. 30, 2018.
Thomas Dawson, Steven Richman, "Multichromic Reflective Layer to Enhance Screen Gain", related U.S. Appl. No. 15/656,495, Applicant's response to Final Office Action filed Feb. 1, 2018.
Thomas Dawson, Steven Richman, "Multichromic Filtering Layer to Enhance Screen Gain", related U.S. Appl. No. 15/656,691, Final Office Action dated Jan. 30, 2018.
Thomas Dawson, Steven Richman, "Multichromic Filtering Layer to Enhance Screen Gain", related U.S. Appl. No. 15/656,691, Applicant's response to Final Office Action filed Feb. 1, 2018.

Steven Richman, Thomas Dawson, Frederick J. Zustak, "Tunable Lenticular Screen to Control Luminosity and Pixel-Based Contrast", related U.S. Appl. No. 15/601,686, Non-Final Office Action dated Jun. 18, 2018.
Steven Richman, Thomas Dawson, Frederick J. Zustak, "Tunable Lenticular Screen to Control Luminosity and Pixel-Based Contrast", related U.S. Appl. No. 15/601,686, Applicant's response to Non-Final Office Action filed Jun. 20, 2018.
Thomas Dawson, Steven Richman, "Multichromic Filtering Layer to Enhance Screen Gain", related U.S. Appl. No. 15/656,691, Examiner's Answer dated Apr. 8, 2019.
Steven Richman, Thomas Dawson, "Tile-Based Lenticular Projection Screen", related U.S. Appl. No. 15/666,247, Non-Final Office Action dated May 3, 2019.
Steven Richman, Thomas Dawson, "Tile-Based Lenticular Projection Screen", related U.S. Appl. No. 15/666,247, Applicant's response to Non-Final Office Action filed May 8, 2019.
Thomas Dawson, Steven Richman, "Multichromic Filtering Layer to Enhance Screen Gain", related U.S. Appl. No. 15/656,691, Applicant's Reply Brief in response to the Examiner's Answer filed Apr. 23, 2019.
Thomas Dawson, Steven Richman, "Microfaceted Projection Screen", related U.S. Appl. No. 15/615,523, Non-Final Office Action dated Jun. 11, 2019.
Thomas Dawson, Steven Richman, "Microfaceted Projection Screen", related U.S. Appl. No. 15/615,523, Applicant's response to Non-Final Office Action filed Jun. 12, 2019.
Dawson et al., "Transparent Glass of Polymer Window Pane as a Projector Screen", related U.S. Appl. No. 15/602,796, Final Office Action dated Jun. 26, 2019.
Dawson et al., "Transparent Glass of Polymer Window Pane as a Projector Screen", related U.S. Appl. No. 15/602,796, Applicant's response to Final Office Action filed Jul. 19, 2019.
Richman et al., "Tile-Based Lenticular Projection Screen", related U.S. Appl. No. 15/666,247, Applicant's response to Final Office Action filed Aug. 22, 2019.
Richman et al., "Tile-Based Lenticular Projection Screen", related U.S. Appl. No. 15/666,247, Final Office Action dated Aug. 20, 2019.
Richman et al., "Tile-Based Lenticular Projection Screen", related U.S. Appl. No. 15/666,247, Applicant's response to Non-Final Office Action filed Oct. 11, 2019.
Richman et al., "Tile-Based Lenticular Projection Screen", related U.S. Appl. No. 15/666,247, Non-Final Office Action dated Oct. 2, 2019.

* cited by examiner

WALLPAPER-BASED LENTICULAR PROJECTION SCREEN

FIELD

The application relates generally to lenticular projection screens.

BACKGROUND

Lenticular screens for video projectors are formed with ridges, and may be particularly suited to three dimensional (3D) projection. In addition, the lenses are particularly suited to increasing the gain when used with short throw projectors while aiding in diminishing the contribution from ambient light. In the case of 3D usage these lenses are arranged vertically. For gain enhancement they are arranged horizontally. Such screens typically require a professional installer to establish the precise alignment required between the projector and the screen. As understood herein, providing a simple paradigm for an untrained end customer to mount such screens can reduce cost and allow more customers to enjoy the benefits of using a lenticular screen with, e.g., a short throw video projection system.

SUMMARY

An apparatus includes a flexible substrate, and plural rows of horizontal lenticular lenses arranged on the substrate in parallel with each other.

The substrate may be integral with the lenticular lenses. Or, the substrate may not be integral with the lenticular lenses and the lenticular lenses are attached to the substrate.

An adhesive can be on a surface of the substrate opposite the lenticular lenses. In some embodiments, a vertical support holds the substrate in a vertical orientation. The vertical support can be a wall. Or, the vertical support can be a partition suspended from a wall or ceiling.

In another aspect, a method includes masking a wall with a mask to expose a projection screen area of the wall. The method includes scoring an edge of a projection screen area along edges of the projection screen area of the wall, removing the mask from the wall, and trimming the projection screen to a size of the projection screen area of the wall. The method also includes applying the projection screen to the wall using a level to ensure that lenticular grooves of the projection screen are parallel to the floor, e.g., parallel to the floor for gain enhancement and vertical for 3D applications.

In another aspect, a system includes a vertical surface in a building, and lenticular wallpaper applied to the vertical surface with horizontally-oriented lenticular lenses arranged thereon. A projector is positioned to project video images onto the lenticular wallpaper.

The details of the present application, both as to its structure and operation, can best be understood in reference to the accompanying drawings, in which like reference numerals refer to like parts, and in which:

DETAILED DESCRIPTION

This disclosure relates generally to computer ecosystems including aspects of consumer electronics (CE) device networks such as projector systems. A system herein may include server and client components, connected over a network such that data may be exchanged between the client and server components. The client components may include one or more computing devices including video projectors and projector screens, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with one or more general purpose processors, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Figure 1:
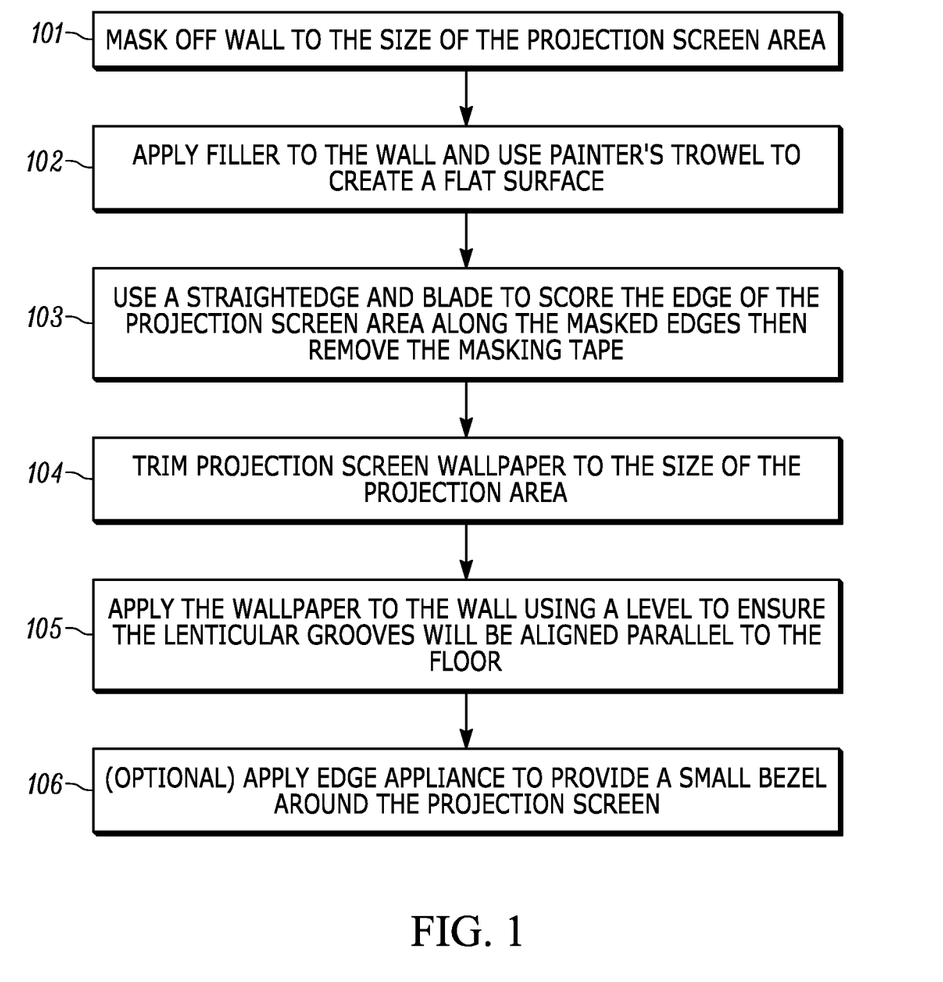
FIG. 1 is a flow chart illustrating steps in the screen installation process.

Now referring to FIG. 1, a method for applying a lenticular screen as wallpaper on a vertical support such as a wall in a home is shown. Commencing at block 101, a portion of the wall corresponding to the size and shape of the desired projection screen area may be masked using, e.g., tape. Proceeding to block 102, filler such as spackling paste may be applied to the wall and smoothed using, for example, a trowel to establish a smooth surface for the wall.

Moving to block 103, a roll of lenticular material is overlaid onto the wall, overlapping the masked area, and then scored along the mask edges using a straightedge and blade. The lenticular material is flexible and may be established by a wallpaper-like substrate with lenticular lenses arranged across the substrate in horizontal rows. Additional details are described further below. The mask on the wall may be removed after the lenticular wallpaper is scored.

Note that while horizontally-oriented lenticular lenses are shown and described herein for short throw projection enhancement, for 3D applications the lenses may be vertically oriented, with present principles applying equally.

It is to be appreciated that after step 103 the lenticular wall paper is scored along edges that define a lenticular screen having the size and shape of the masked area of the wall from step 101. The wallpaper may be removed from the wall and then cut at step 104 along the score lines that were made in step 103. The lenticular screen is then held against the wall once more at step 105 and applied to the wall using adhesive, using a level as described further below to ensure the lenticular lenses are horizontal. If desired, an edge appliance such as molding or other decorative feature may be applied at step 106 around the lenticular screen to establish a bezel around the screen.

Figure 2:
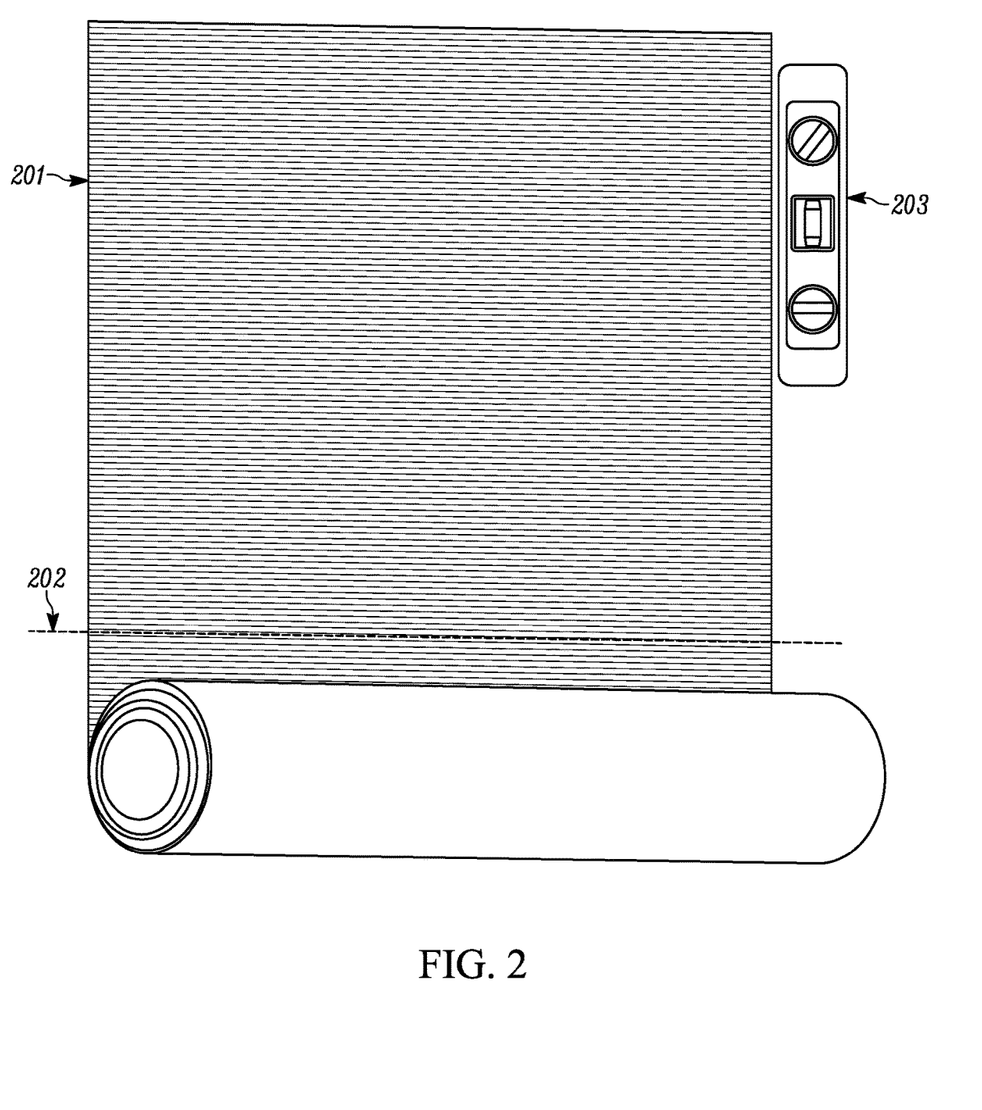
FIG. 2 schematically illustrates a vertically-rolled wallpaper lenticular screen with installation tools.

FIG. 2 provides illustration of steps described above. A lenticular projection screen wallpaper 201, which may come in rolled configuration as indicated in FIG. 2, is cut to fit the area of the wall that has been masked as shown at 202. A level 203 can be used to align the wallpaper piece vertically. Additional sections of wallpaper can be applied to cover the entire area of the wall that was prepared. The direction of the lenticular lenses should be parallel to the floor. In the example of FIG. 2 the wallpaper 201 is applied vertically, i.e., is unrolled onto the wall in a vertical rolling motion.

Figure 3:
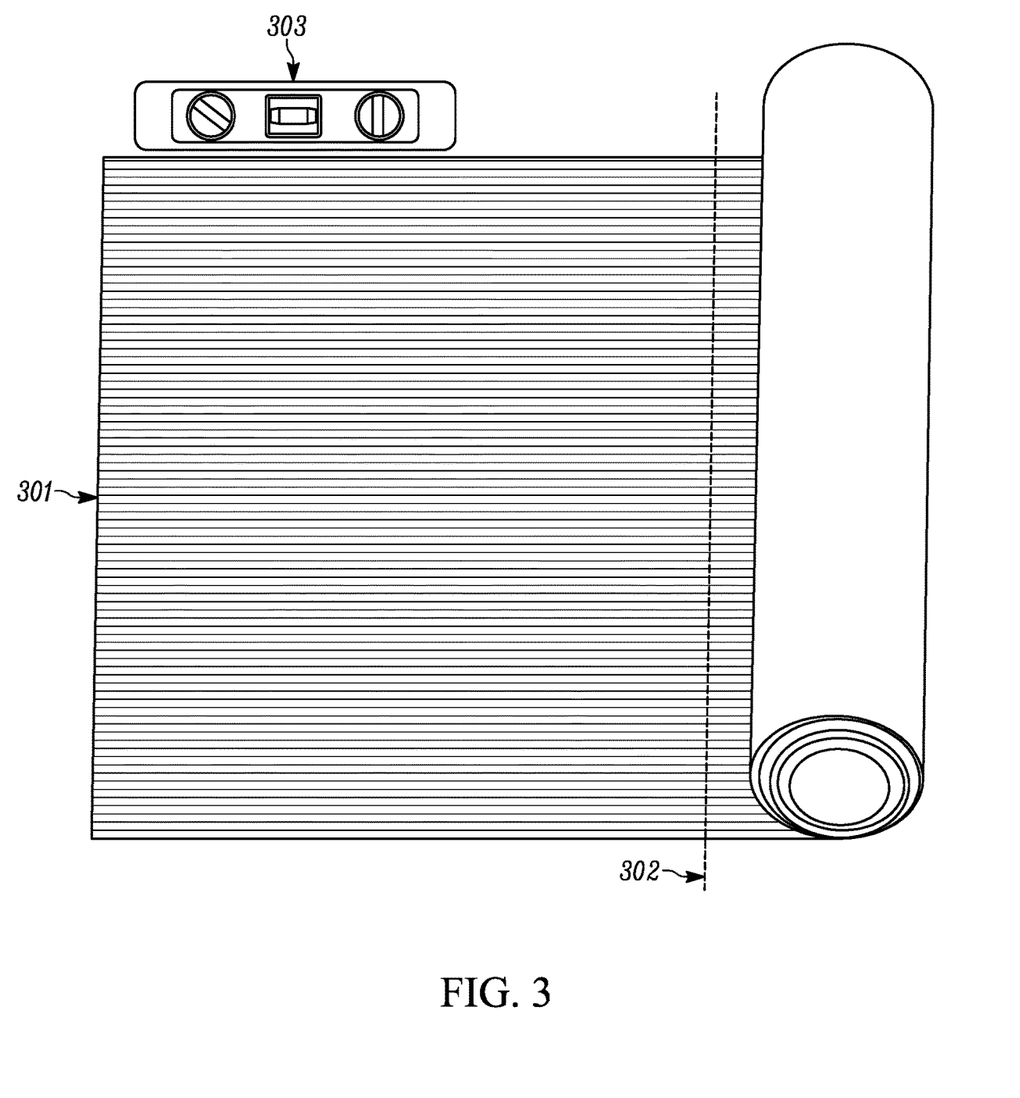
FIG. 3 schematically illustrates a horizontally-rolled wallpaper lenticular screen with installation tools.

Or, the wallpaper may be applied using a horizontal rolling motion. FIG. 3 illustrates.

As shown, a lenticular projection screen wallpaper 301 is cut along mask lines 302 to fit the area of the wall that has been prepared according to FIG. 1. A level 303 may be used to align the wallpaper piece vertically. Additional sections of wallpaper can be applied to cover the entire area of the wall that was prepared. The direction of the lenticular surface should be parallel to the floor. In the example of FIG. 3, the lenticular wallpaper is applied horizontally, i.e., is unrolled onto the wall in a vertical rolling motion.

Note that for horizontal lenticular lenses (for UST applications, as an example), FIG. 2 most appropriately applies, whereas for vertical lenticular lenses (for 3D applications, as an example), FIG. 2 most appropriately applies. In other words, if the lenses are configured perpendicular to the direction the wallpaper rolls up, then it may be applied top to bottom, whereas if the lenses are configured to be along the direction the wallpaper rolls up, then the wallpaper is applied left to right.

Figure 4:
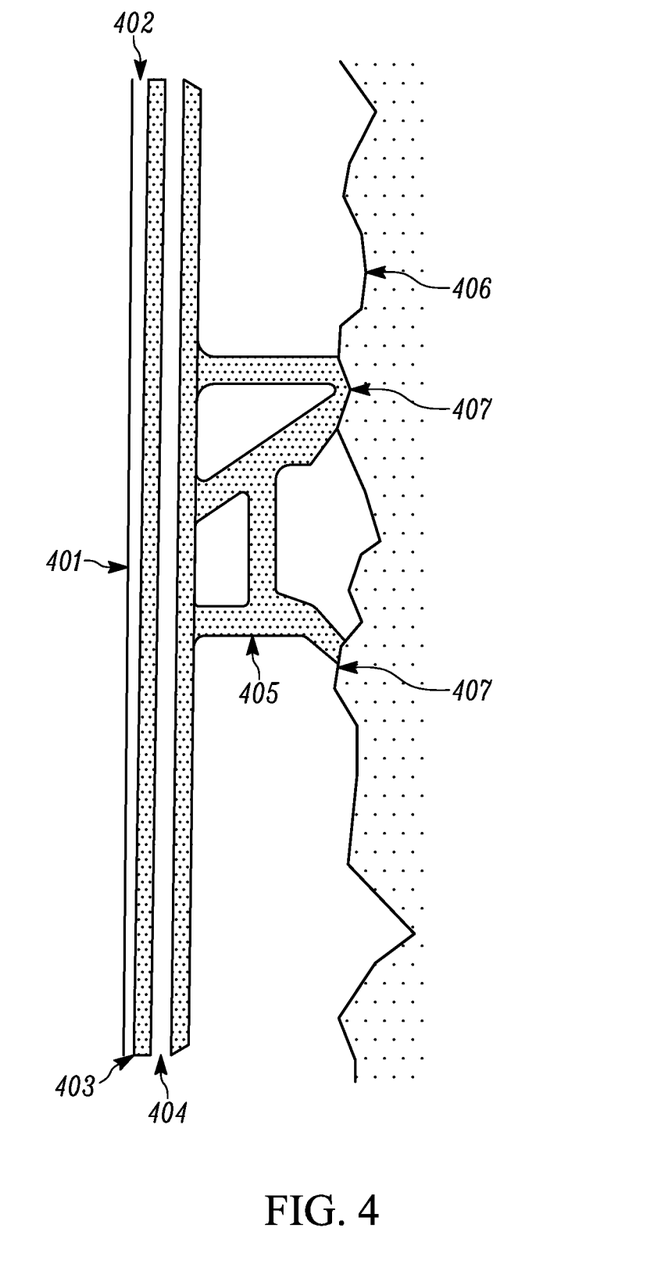
FIG. 4 is a side schematic view of a lenticular screen on a suspended substrate.

Instead of applying the lenticular wallpaper to a structural or decorative interior wall of a building, FIG. 4 shows that it may be applied to a support that is suspended vertically in a building, e.g., using a frame backing hung from a bracket. In FIG. 4 a lenticular projection screen wallpaper 401 is adhered using adhesive 402 to a stiff metal or plastic or plaster plate 403 that in turn can be attached using plate adhesive 404 to a vertical surface of a bracket 405, essentially hanging the wallpaper 401 from the bracket 405. The vertical surface of the bracket 405 may be displaced away from a wall 406 to which the bracket is mounted as shown. Wall attachments 407 may couple the bracket to the wall and may be mechanical (such as screws) or adhesive depending on the characteristics of the wall. Many types of brackets 405 may be used to mount to stiff plates 403 in the case of a rough wall 406 (such a brick) renders the all otherwise unsuitable for a direct wallpaper application. The stiff plate 403 may alternatively being hung from the ceiling as long as the stiff plate is held firmly in position and does not move or wobble in relation to the short throw projector.

Now specifically referring to FIG. 5, an example ecosystem 10 is shown, which may include one or more of the example devices mentioned above and described further below in accordance with present principles. The first of the example devices included in the system 10 is a projection screen assembly 12. The projection screen assembly 12 can be established by some or all of the components shown in FIG. 5. The projection screen assembly 12 may include an active display or screen in that it contains addressable screen elements that establish screen pixels and that can be controlled to establish grayscale values. Or, the assembly 12 may be a passive screen. In any case, the present screen preferably is a lenticular screen. When implemented by an active screen for, e.g., establishing grayscale values on the screen itself in coordination with color light projected onto the screen from the projector, the techniques described in the present assignee's U.S. Pat. No. 9,640,143, incorporated herein by reference, may be used.

The projection screen assembly 12 can include one or more lenticular screens or displays 14. The projection screen assembly 12 may also include one or more speakers 16 for outputting audio in accordance with present principles.

For active screen assemblies, the assembly can include at least one input device 18 such as e.g. an audio receiver/microphone or key pad or control keys for e.g. entering commands to at least one screen processor 20. An example active screen assembly 12 may also include one or more network interfaces 22 for communication over at least one network 24 such as the Internet, an WAN, an LAN, etc. under control of the one or more processors 20. Thus, the interface 22 may be, without limitation, a Wi-Fi transceiver, which is an example of a wireless computer network interface, such as but not limited to a mesh network transceiver, or it may be a Bluetooth or wireless telephony transceiver. It is to be understood that the processor 20 may control the screen assembly 12. Furthermore, note the network interface 22 may be, e.g., a wired or wireless modem or router, or other appropriate interface such as, e.g., a wireless telephony transceiver, or Wi-Fi transceiver as mentioned above, etc.

In addition to the foregoing, an active screen assembly 12 may also include one or more input ports 26 such as, e.g., a high definition multimedia interface (HDMI) port or a USB port to physically connect (e.g. using a wired connection) to another CE device and/or a headphone port to connect headphones to the screen assembly 12 for presentation of audio from the screen assembly 12 to a user through the headphones. For example, the input port 26 (and/or network interface 22) may be connected via wire or wirelessly via the network 24 to a cable or satellite or other audio video source 28 with associated source processor 28A and source computer memory 28B. Thus, the source may be, e.g., a separate or integrated set top box, or a satellite receiver. Or, the source 28 may be a game console or personal computer or laptop computer or disk player. Yet again, the source 28 and/or the color video source discussed below may be cloud servers on the Internet, and may include and perform "cloud" functions such that the devices of the system 10 may access a "cloud" environment via the server 28 in example embodiments. Or, the server 28 may be implemented by a game console or other computer in the same room as the other devices shown in FIG. 5 or nearby.

An active screen assembly 12 may further include one or more computer memories 30 such as disk-based or solid state storage that are not transitory signals, in some cases embodied in the chassis of the screen as standalone devices or as a personal video recording device (PVR) or video disk player either internal or external to the chassis of the AVDD for playing back AV programs or as removable memory media.

Figure 5:
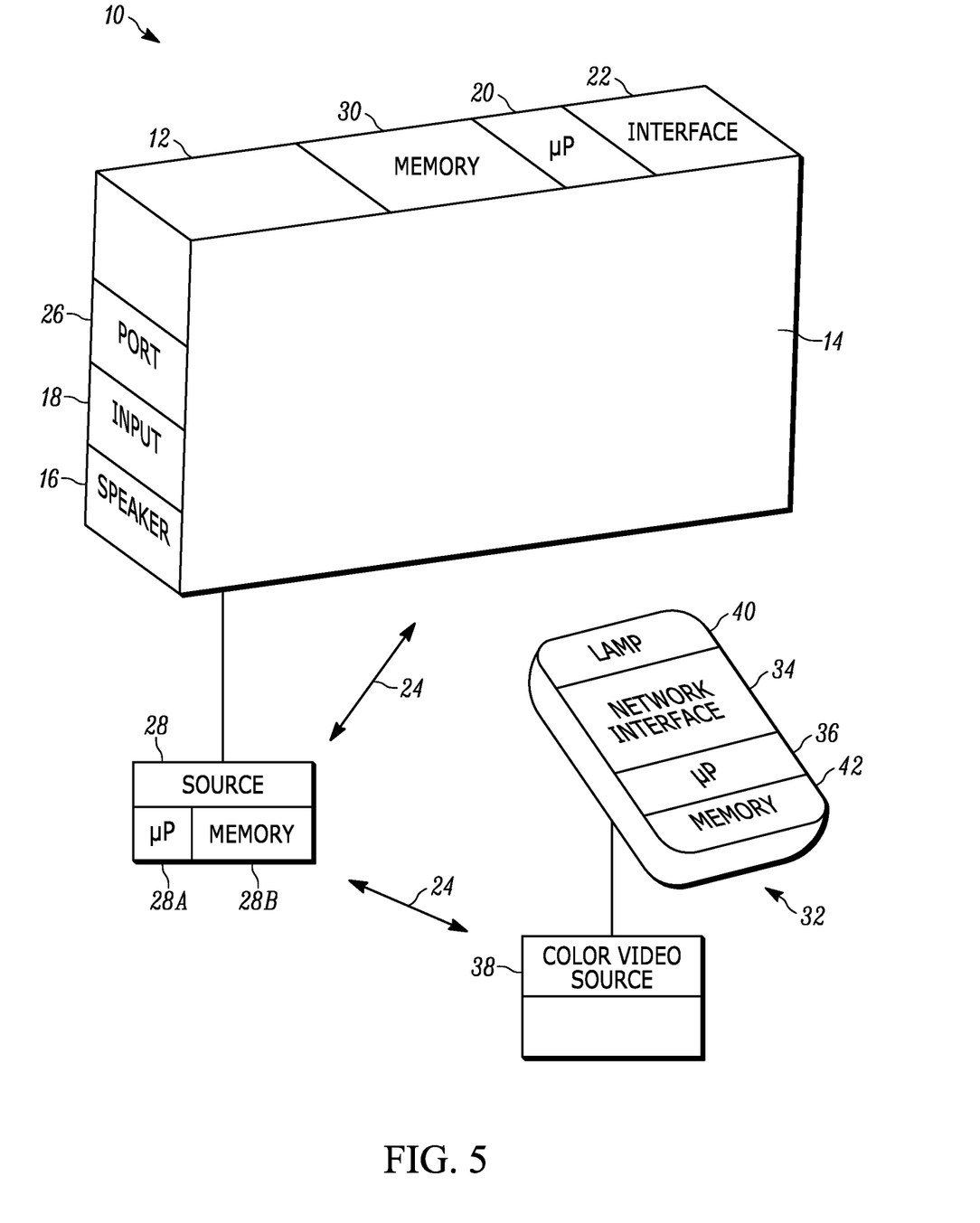
FIG. 5 is a block diagram of an example system including an example in accordance with present principles.

Still referring to FIG. 5, in addition to the AVDD 12, the system 10 may include one or more other device types. When the system 10 is a home network, communication between components may be according to the digital living network alliance (DLNA) protocol. Or, the projector and screen can be used in a public movie theater.

In one example, a front projector 32 such as but not limited to a Sony ultra short throw (UST) projector may be used to project demanded images onto the front of the display 14. The example projector 32 may include one or more network interfaces 34 for communication over the network 24 under control of one or more projector processors 36. Thus, the interface 34 may be, without limitation, a Wi-Fi transceiver, which is an example of a wireless computer network interface, including mesh network interfaces, or a Bluetooth transceiver, or a wireless telephony transceiver.

It is to be understood that the projector processor 36 controls the projector 32 to undertake present principles. In this regard, the projector processor 36 may receive signals representing demanded color images from a color video source 38 which may be the same as or different from the video source 28 described previously and which may be established by any one or more of the source types described previously.

The projector processor 36 controls a lamp assembly 40 to project color light onto the screen assembly 12. The lamp assembly may be a laser lamp assembly or other type of color illuminator assembly. The projector may further include one or more computer memories 42 such as disk-based or solid state storage.

As shown in FIG. 5, the screen 12 may be mounted on a substrate 44 such as but not limited to a wall or window.

Figure 6:
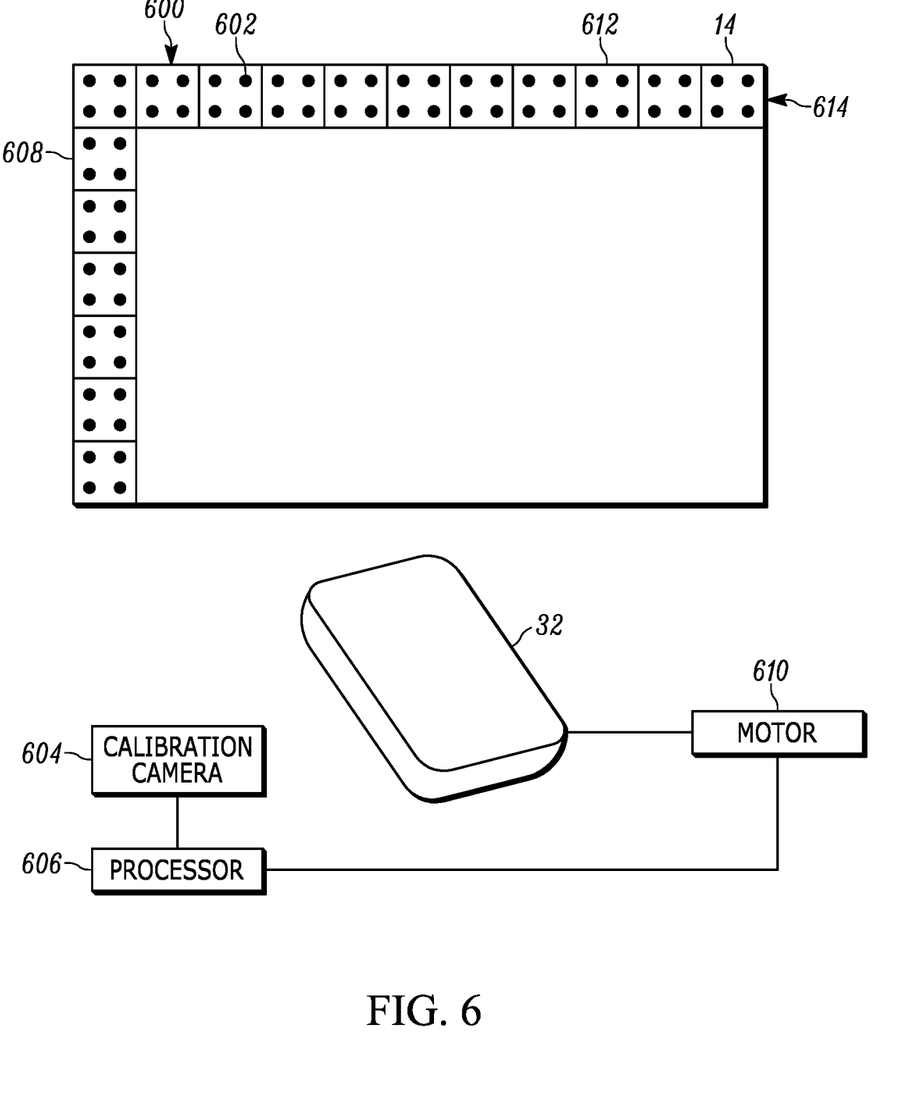
FIG. 6 is a schematic view of the projection screen illustrating an example alignment initialization process, in which one or more edges of the projected pixel footprint are aligned with respective edges of the screen.

FIG. 6 illustrates an example alignment initialization process of a calibration process. In some implementations, the edges of the projected image from the projector 32 are first aligned with edges of the screen 14. In the example shown, a left-most column 600 of projected pixels 602 can be projected onto the screen 14. A calibration camera 604 may capture the image of the column 600. The calibration camera 604 can be controlled by a processor 606.

Based on the image from the calibration camera 604, the optics of the projector 32 and/or the direction in which the projector 32 is pointed and/or the distance at which the projector 32 is from the screen 14 can be modified to align the left-most column 600 with the left edge 608 of the active portion of the screen 14 as shown, with the left edge being made more visibly manifest by causing the left-most one, two, or three columns of screen pixels to be all white. The projector 32 may be moved left or right by hand by a person observing the image of the column 600 and/or the column 600 itself as it appears on the screen. Or, the processor 606 may receive the image of the column 600 and control a motor 610 (such as a servo or stepper motor or other appropriate apparatus) to move the optics and/or housing of the projector 32 to align the column 600 with the left edge 608.

Note that in some implementations, the left most column 600 may not be aligned with the left edge 608 of the active portion of the screen but rather with a column of screen pixels that is inboard of the left edge and thereafter regarded as a virtual left edge by the system.

It may also be desirable to align the projector 32 with the top edge 612 of the screen 14, with the top edge being made more visibly manifest if desired by causing the top-most one, two, or three rows of screen pixels to be all white. In the example shown, a top-most row 614 of projected pixels can be projected onto the screen 14. The calibration camera 604 may capture the image of the row 614.

Based on the image from the calibration camera 604, the optics of the projector 32 and/or the direction in which the projector 32 is pointed and/or the distance at which the projector 32 is from the screen 14 can be modified to align the top-most row 614 with the top edge 612 of the active portion of the screen 14 as shown. The projector 32 may be moved hand by a person observing the image of the row 614 and/or looking at the row 614 itself as it appears on the screen. Or, the processor 606 may receive the image of the row 614 and control the motor 610 to move the optics and/or housing of the projector 32 to align the row 614 with the top edge 612.

Note that in some implementations, the top most column 614 may not be aligned with the top edge 612 of the active portion of the screen but rather with a column of screen pixels that is below the top edge and thereafter regarded as a virtual top edge by the system. Note further that the edges 608, 612 may alternatively be the physical edges of the screen if desired, when the physical edges are not coterminous with the edges of the active portion of the screen.

If desired, once the left and top rows of projected are aligned with the left and top edges as described, the right and bottom projected pixel column/row may be aligned with the respective edges of the screen according to the algorithm above by, e.g., expanding or shrinking the footprint of the projected image using, e.g., the optics of the projector or by other means. Or, once the first two edges are aligned, the remaining two edges of the projected image may be projected onto the screen with the underlying screen pixels thus being designated as the virtual right and bottom edge of the screen for calibration purposes.

Figure 7:
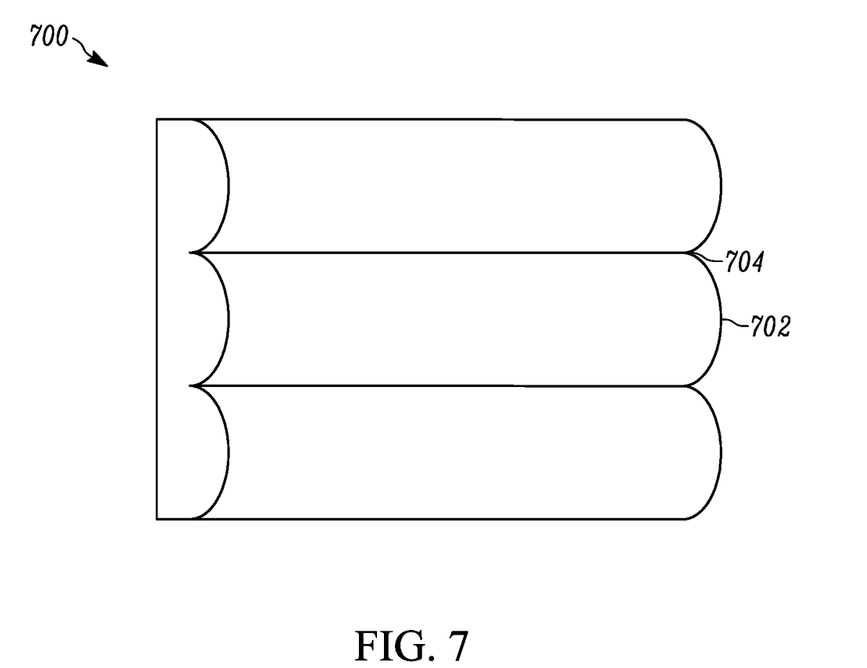
FIGS. 7 and 8 are respectively perspective and side views of a portion of the lenticular screen/wallpaper.
Figure 8:
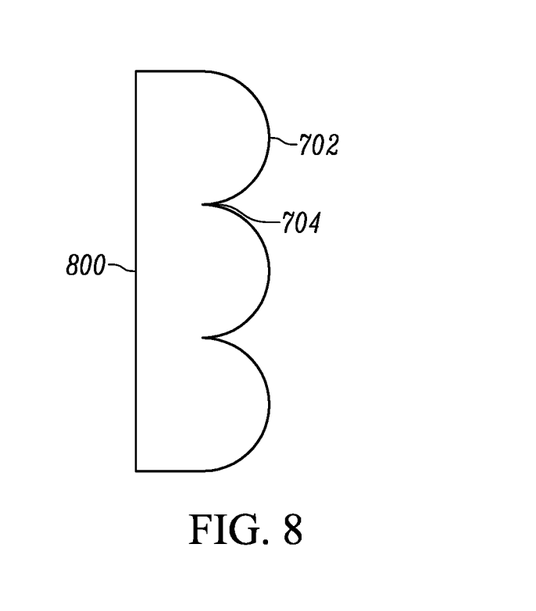

FIGS. 7 and 8 illustrate further details of the lenticular wallpaper described herein. As shown, lenticular wallpaper 700 comprises horizontal (when mounted on the wall) lenticular lenses 702 separate from each other by grooves 704. Each lens 702 can be horizontally elongated and transversely convex as shown. The lenses 702 are on a lens side of a substrate that has an opposed flat side 800 that is applied to the wall. The lenses 702 may be made separately from the substrate and applied thereto using, e.g., adhesive, ultrasonic bonding, heat bonding, etc., or the lenses 702 may be made integrally with the substrate. The lenticular wallpaper thus may be established by a single piece of injection molded plastic or other appropriate material onto which the lenses are formed.

The above methods may be implemented as software instructions executed by a processor, including suitably configured application specific integrated circuits (ASIC) or field programmable gate array (FPGA) modules, or any other convenient manner as would be appreciated by those skilled in those art. Where employed, the software instructions may be embodied in a device such as a CD Rom or Flash drive or any of the above non-limiting examples of computer memories that are not transitory signals. The software code instructions may alternatively be embodied in a transitory arrangement such as a radio or optical signal, or via a download over the internet.

It will be appreciated that whilst present principals have been described with reference to some example embodiments, these are not intended to be limiting, and that various alternative arrangements may be used to implement the subject matter claimed herein.

What is claimed is:

1. Apparatus comprising:
   a flexible substrate; and
   plural rows of elongated horizontal lenticular lenses arranged on the substrate in parallel with each other, the lenses being transversely convex with opposed flat sides, wherein the substrate is integral with the lenticular lenses such that the substrate and lenses are established by a single piece of injection molded plastic, wherein the plural rows of elongated horizontal lenticular lenses are configured to reflect or refract projected light from a projector.

2. The apparatus of claim 1, comprising adhesive on a surface of the substrate opposite the lenticular lenses.

3. The apparatus of claim 1, comprising a vertical support holding the substrate in a vertical orientation.

4. The apparatus of claim 3, wherein the vertical support comprises a wall.

5. The apparatus of claim 3, wherein the vertical support comprises a partition suspended from a wall or ceiling.

6. Apparatus comprising:
   a flexible substrate; and
   plural rows of elongated horizontal lenticular lenses arranged on the substrate in parallel with each other, the lenses being transversely convex with opposed flat sides;
   a stiff plate coupled to the flexible substrate;
   a bracket coupled to the stiff plate and engageable with a vertical support; and
   at least one projector configured to project images onto the lenses.

7. The apparatus of claim 6, wherein when the bracket is engaged with the vertical support, a vertical surface of the bracket is displaced away from the vertical surface.

8. The apparatus of claim 7, comprising plural wall attachments for coupling the bracket to the vertical surface.

\* \* \* \* \*